May 10, 1927.  
J. W. DAVIS  
1,628,579  
CIRCUIT CLOSER  
Filed Oct. 12, 1925
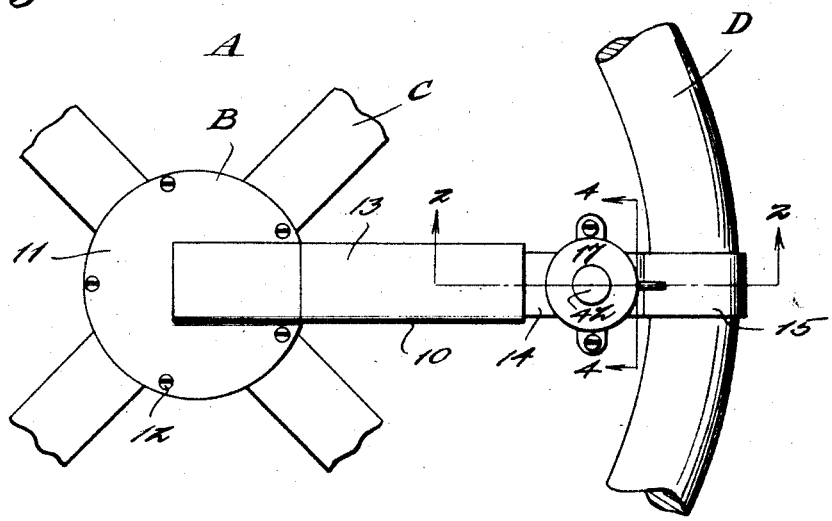
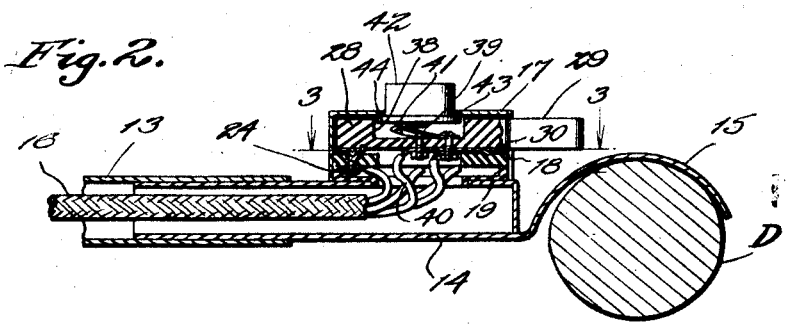
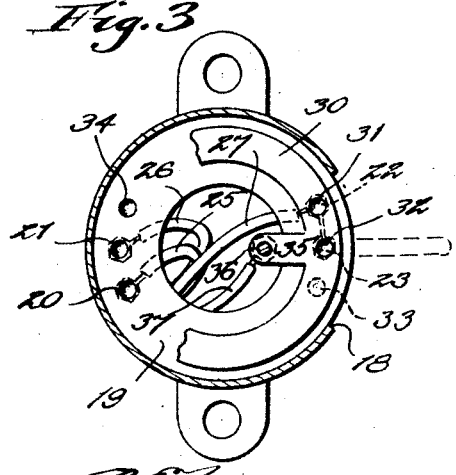
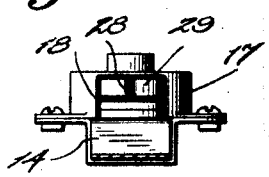
Joshua W. Davis  
INVENTOR  
BY Victor J. Evans  
ATTORNEY
WITNESS:

Patented May 10, 1927.

1,628,579

UNITED STATES PATENT OFFICE.

JOSHUA W. DAVIS, OF SUMTER, SOUTH CAROLINA.

CIRCUIT CLOSER.

Application filed October 12, 1925. Serial No. 62,137.

This invention relates to circuit closers and has for its object the provision of a novel combined horn button and switch designed to be mounted upon the steering wheel or other convenient portion of a motor vehicle and operable to effect energization of the horn and to control the energization of the headlights and tail light, the advantage being that the entire control is located at one point within instant reach of the operator so that there will be no necessity for removing the hands from the steering wheel to sound the horn or to dim or brighten the lights as occasion may arise.

An important object is to provide a device of this character which is so constructed as to be mounted upon the steering wheel in a very simple manner, the device itself being inexpensive to make, easy to install, positive and convenient in action, efficient and durable in service, and a general improvement in the art.

With the above and other objects and advantages in view, the invention consists in the details of construction and arrangement of parts to be hereinafter more fully described and claimed, and illustrated in the accompanying drawing in which:

Figure 1 is a fragmentary plan view of a steering wheel with the invention in applied position, Figure 2 is a section taken on the line 2—2 of Figure 1, Figure 3 is a horizontal section taken on line 3—3 of Figure 2, Figure 4 is a vertical cross section taken on the line 4—4 of Figure 1.

Referring more particularly to the drawings the letter A designates a portion of a steering wheel including the usual hub B, spokes C and rim D.

In carrying out the invention I provide a support designated generally by the numeral 10, which support is here shown as including a disk 11 adapted to be secured upon the hub portion of the wheel as for instance by means of screws 12. The disk carries a hollow member 13 within which is telescopically engaged a casing member 14 terminating in a curved extension 15 engaged partially about the wheel rim D in conforming engagement therewith. This telescopic casing member constitutes a housing for the member 16 which comprises all the wires leading to the battery, or other source of current, the headlights, the tail light and the horn. These various articles are not shown as they form no part of the present invention.

Mounted upon the casing 14 is a cylindrical casing 17 formed in one side with a slot 18. Secured within the lower portion of this casing 17 is a disk or other support 19 of insulating material. Carried by this disk member 19 are metallic contacts 20, 21, 22 and 23 which may, in actual practice, consist simply of screws having concaved heads countersunk in the disk so as to be located at a lower plane than the surface thereof for a reason which will be hereinafter made apparent. The various screws carry binding nuts 24 which provide means for connection of the wires therewith. Connected with the screw 20 is a wire 25 for supplying current to the headlights and connected with the contact 21 is a wire 26 for feeding current to the headlights through a suitable interposed resistance, not shown, whereby the headlights may be dimmed. Both of the contacts 22 and 23 are connected with a wire 27 which leads to the tail light.

Rotatably mounted within the upper portion of the casing 17 is a disk 28 of insulating material carrying an operating handle 29 movable along the slot 18. On the underside of this disk 28 is secured a metallic ring 30 formed with projections 31 and 32 adapted to be brought selectively into engagement with the contacts 22 or 23 and 20 or 21. It might also be mentioned that the disk 19 is formed with depressions 33 and 34 adapted to receive the humps or projections 31 and 32 respectively. The metallic ring 30 is formed with an inwardly projecting extension 35 carrying a binding screw 36 with which connects a wire 37 leading to the storage battery or other source of current.

Formed in the center of the rotatable disk 28 is a recess 38 at the center of which is mounted a contact 39 with which is connected a wire 40 leading to the horn, not shown. Connected and secured by the above described screw 36 and mounted upon the extension 35 is a movable spring contact 41 normally spaced away from the contact 39 and engaged by a push button 42 which is slidably mounted through an opening 43 in the top of the casing 17, this push button having an outstanding flange 44 preventing it from withdrawal.

In the operation of the device it will be seen that regardless of the position of the rotary disk 28 the application of pressure upon the button 42 will cause the contact 41 to engage the contact 39 for closing the circuit through the horn. If all the lights on the car are to be in the "off" position, the handle 29 is grasped and moved to rotate the disk 28 into such position that the projections 31 and 32 on the band or ring 30 will be engaged within the depressions 33 and 34 respectively. If the operator wishes to energize the headlights dim, he grasps the handle 29, or pushes it with his thumb, or otherwise moves it from the above described "off" position into such position that the projections 31 and 32 will be engaged respectively with the contacts 23 and 21, the former permitting current to pass to the tail light and the latter closing the circuit through whatever resistance is provided and to the headlights. If it is desired that the headlights burn brightly, the operator moves the handle 29 still further to bring the projections 31 and 32 into engagement with the contacts 22 and 20 respectively. In either of these two last named positions it is clear that the tail light will be energized.

From the foregoing description and a study of the drawings it will be apparent that I have thus provided a very simply constructed and inexpensive circuit closer adapted to be mounted upon a steering wheel in such position as to be within convenient reach of the operator at all times, both the horn button and light control switch being in such position as to be operated by the thumb without removal of the hand from the wheel, thus making driving safer and more convenient. It is believed that the construction, operation and advantages will be readily apparent to one skilled in the art without further explanation.

While I have shown and described a preferred embodiment of the invention, it should be understood that I reserve the right to make such changes in the form, construction and arrangement of parts as will not depart from the spirit of the invention or the scope of the subjoined claim.

Having thus described the invention, I claim:

In a circuit closer, a support, a casing carried by said support, a stationary member of insulating material disposed in said casing, a circumferential series of contacts carried by said stationary insulating member and counter-sunk therein in a manner to be spaced below the surface thereof, a rotatable disk member of insulating material mounted within the casing, an operating handle laterally extending therefrom and through a slot in the side of said casing, a metallic ring secured on the underside of said rotatable disk member and having downwardly extending projections adapted to be brought into engagement with selected ones of said contacts, said casing having its top formed with an opening, said rotatable disk member being provided with a recess with the edge of the casing at the opening overhanging the recess, a central contact secured to said rotatable disk member and arranged in said recess, an inwardly projecting extension formed on the metallic ring, an additional binding post carried by the extension and arranged in spaced relation to the central contact, a spring contact secured to said additional binding post and arranged within the recess, a flanged push button slidably mounted in the recess with its flange engageable with the overhanging portion of the casing, and said flange push button being engageable with the spring contact for the purpose specified.

In testimony whereof I affix my signature.

JOSHUA W. DAVIS.